United States Patent [19]

Bergström et al.

[11] Patent Number: 4,716,573
[45] Date of Patent: Dec. 29, 1987

[54] METHOD OF REDUCING THE EFFECT OF NARROWBAND JAMMERS IN RADIO COMMUNICATION BETWEEN TWO STATIONS

[75] Inventors: Bo C. Bergström, Täby; Knut O. M. Herolf, Österskär, both of Sweden

[73] Assignee: Telefonaktiebolaget LM Ericsson, Stockholm, Sweden

[21] Appl. No.: 796,297

[22] Filed: Nov. 8, 1985

[30] Foreign Application Priority Data

Nov. 19, 1984 [SE] Sweden ............................... 8405818

[51] Int. Cl.$^4$ ............................................... H04K 1/00
[52] U.S. Cl. ........................................ 375/1; 375/109; 455/69
[58] Field of Search ................. 375/1, 2.1, 2.2, 34, 375/58; 370/79, 110.1, 93, 104; 455/62, 69; 371/34, 109

[56] References Cited

U.S. PATENT DOCUMENTS

| | | | |
|---|---|---|---|
| 2,862,203 | 11/1958 | Skaraeus et al. | 343/18 E |
| 3,934,224 | 1/1976 | DuLaney et al. | 371/34 |
| 4,004,098 | 1/1977 | Shimasaki | 370/104 |
| 4,271,524 | 6/1981 | Goodman et al. | 370/93 |
| 4,309,771 | 1/1982 | Wilkens | 455/69 |
| 4,355,399 | 10/1982 | Timor | 375/1 |

FOREIGN PATENT DOCUMENTS

0068690A1  1/1983  European Pat. Off.

Primary Examiner—Robert L. Griffin
Assistant Examiner—Stephen Chin
Attorney, Agent, or Firm—Roberts, Spiecens & Cohen

[57] ABSTRACT

A method for reducing the effect of narrowband jammers in communication between two stations utilising frequency hopping. A new frequency at a hop is not selected merely with the aid of random number generation, but also with learnt knowledge of the radio communication surroundings affecting the selection. The frequencies ($f_1 \ldots f_n$) available for frequency hopping are stored with different status in a list (X). The status of the different frequencies is determined by quality measurement of the channel selected in a radio communication, and by examining the status of the selected frequency ($f_x$) in relation to the status of the remaining frequencies ($f_1 \ldots f_n$).

4 Claims, 4 Drawing Figures

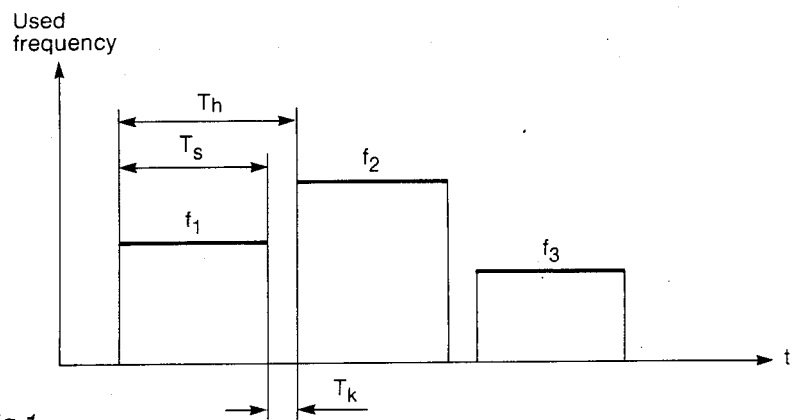
Fig 1
X-matrix
| Mapping frequency | 1 | 3 | 3 | 5 | ---- | 12 | ---- | 1 |
|---|---|---|---|---|---|---|---|---|
| Status | 0 | 1 | 0 | 2 | ---- | −1 | ---- | 1 |
| Time index | 0 | 2 | 0 | 4 | ---- | 0 | ---- | 5 |
Fig 2
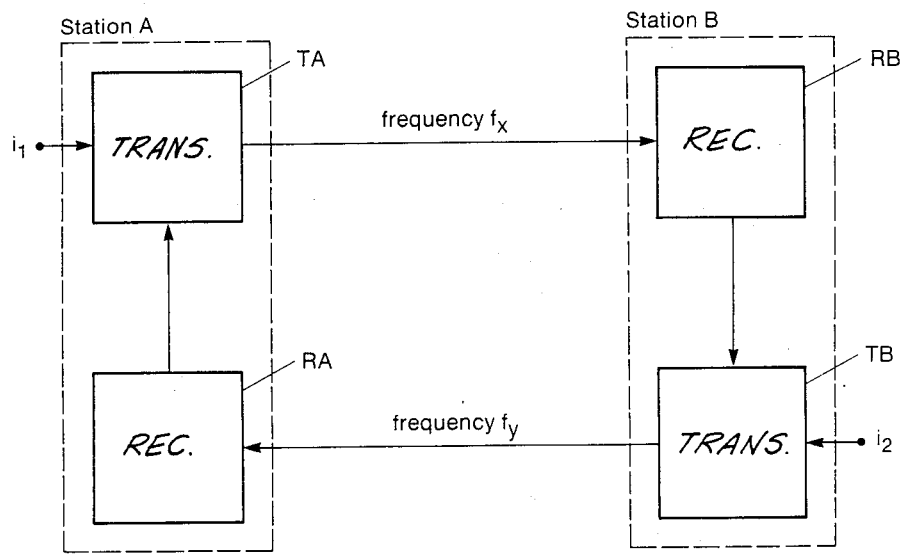
Fig 3

METHOD OF REDUCING THE EFFECT OF NARROWBAND JAMMERS IN RADIO COMMUNICATION BETWEEN TWO STATIONS

FIELD OF INVENTION

The invention relates to a method in which communicating radio stations utilise bandspreading with the object of avoiding external interference sources, referred to herein as jammers.

BACKGROUND

In an environment including narrowband jammers, substantial reduction of the effect of the jammer is enabled by utilising bandspreading. In principle the jammer may be of two kinds: (a) known jammers such as local TV stations, the frequency bands of which are known, and can therefore be avoided from the begining of communication, and (b) jammers operating at known or unknown frequencies or frequency bands during communication and are the most difficult to avoid.

The jammers according to (b) are those most difficult to avoid.

Radio communication using frequency hopping to provide bandspreading is already known in the art, as shown, for example, in EP-A1-0068690. In this known system, each signal received is analysed as to its quality. If more than one radio connection (transceiver) has hopped to the same frequency, no new signal is sent on the frequency of the received signal, but the frequency of a signal received earlier or later is used instead. Colliding frequencies are thus taken into consideration in this known system, but the frequency hop takes place solely through the selection of the frequency by random number generation.

In a conventional frequency hopping system, a new frequency $f_n$ is generated by a random number $r_n$ is created and used as an argument in a function $H(r_n)$, i.e. $F_n = H(r_n)$. The selection of the frequency $F_r$ in a related receiver and transmitter should give the same values in the transmitter and receiver that are to communicate.

SUMMARY OF INVENTION

In the adaptive frequency hopping system provided in the method according to the present invention, new frequencies are not solely determined by random numbers. Instead, knowledge of the environment around the radio connection is used to affect the selection. While operating the connection, such knowledge is collected stored in the receiver, e.g. as a list X of the radio channels used. The list X will then be the knowledge gained, and its contentscan continuously, or after interruption, be updated in time with the different frequency hops.

An object of the present invention is to provide a method of eliminating or reducing the effect of external interference sources in a radio connection, using frequency hops where the selection of frequencies is not solely dependnt on random number generation, but also on knowledge of the jamming or interference environment which is continually collected during the operation of the radio communication system. Examples of the knowledge that is collected include jamming frequencies and the level of the transmitter power in the system.

In achieving the above and other objects of the invention, there is provided a method of reducing the effect of narrowband jammers in communication between first and second stations across a radio channel having a varying transmission quality in dependence on the aforementioned jammer by using frequency hopping which includes periodically changing the transmitting frequency from the first station to the second station and a transmission frequency from the second to the first station with a given period. A plurality of fixed frequencies which are randomly generated are available for the frequency hopping, each of these frequencies having mutually different or equal status values indicative of giving disturbance free or acceptable communication across the radio channel. A characteristic signal is sent from the first station to the second station on one of the fixed frequencies to test the channel quality for that frequency with respect to jammers when communicating between stations, the result of that quality is measured in the second station and the result is transmitted from the second station and received at the first station in a form so that the result is not affected by the jammers, the result is entered as a status value for the associated frequency. It is then decided in dependence on the status value whether the frequency should be used as a transmitting frequency or whether a second frequency should be chosen as a communicating frequency. The second frequency represents a mapping frequency obtained from a previous measurement giving disturbance free communication.

BRIEF DESCRIPTION OF DRAWINGS

The invention will next be described in detail with reference to the accompanying drawings in which FIG. 1 is a time chart of frequency hops useful to an understanding of the invention, FIG. 2 is a diagram giving the status of used frequencies, FIG. 3 is a simplified block diagram of a radio connection between two stations.

DETAILED DESCRIPTION

Figure 4:
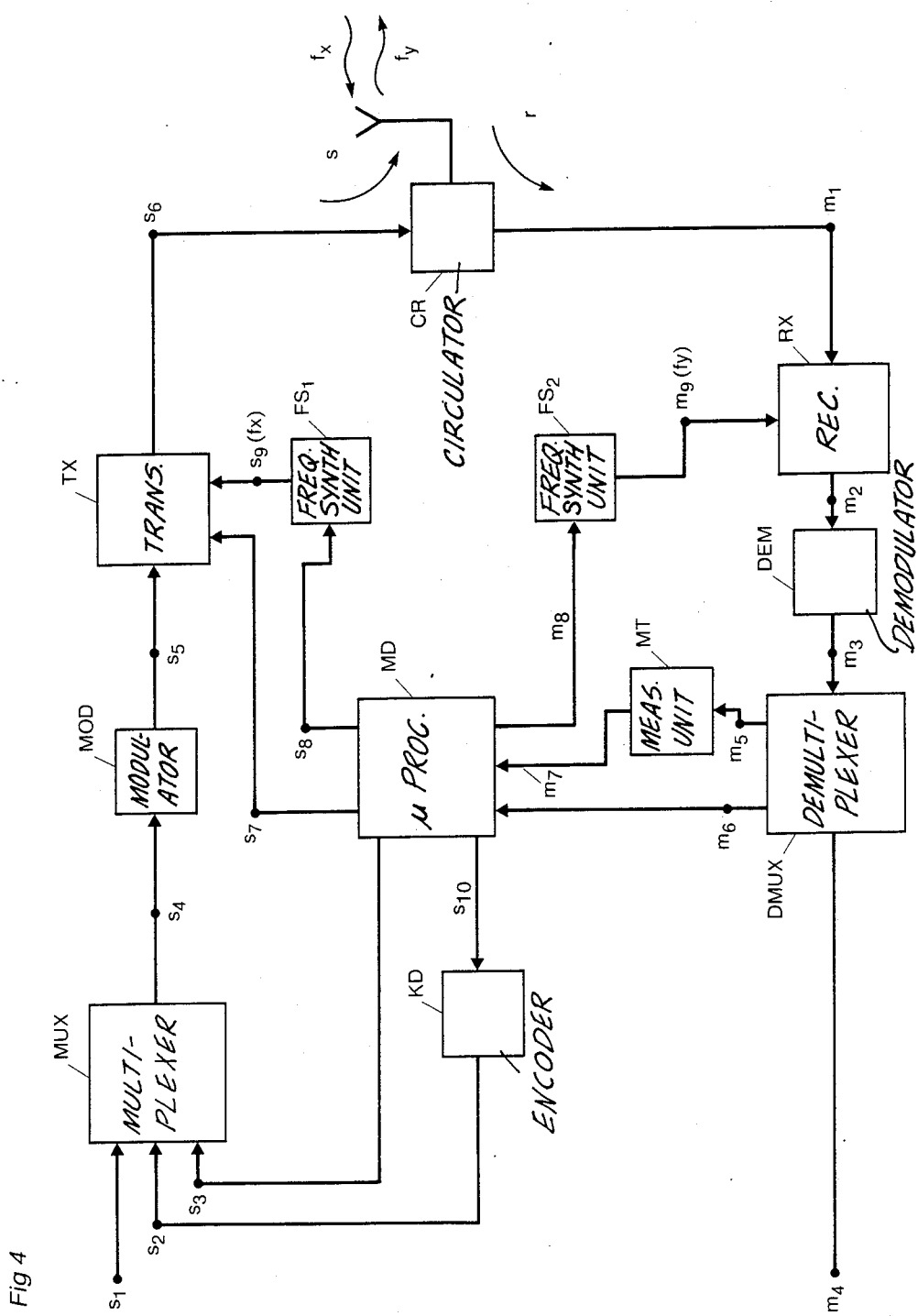
FIG. 4 is a more detailed block diagram for explaining the method of the invention.

FIG. 1 is a time chart for frequency hops in a radio communication system. The hop interval $T_h$ determines the rate at which new frequencies are generated, e.g. by a random number generator. This means that frequencies are generated every $T_h$ -th second. During the transmitting interval $T_s$ communication is in progress at the freqeuncy $f_1$. During the interval $T_k$, the so-called resetting interval, there is a hop to another freqeuncy $f_2$. The method described here is applied during the interval $T_s$ in the transmitter and receiver units at both communicating stations, while radio communication is silent during the interval $T_k$.

In the frequency hopping system applying the method, the new frequency $f_2$ is not solely determined by a generated random number. Learned knowledge of the surroundings is also used to affect the selection. The knowledge collected during operation of the stations is in a state matrix X, illustrated in FIG. 2. The contents of X can be updated dynamically during the transmitting interval $T_s$ and the rate of change is $1/T_h$.

The state matrix X contains information on presently permitting and prohibited frequencies. The matrix has three rows and N columns, where N is the number of available frequencies in the frequency hopping system. In the first row there are the values for the mapping frequencies (see below). The second row shows the status of a frequency value giving a quality measure calculated with respect to parameters as signal strength and jamming. The third row contains a time index. In FIG. 2 there is illustrated an example of a realisation of the X matrix.

Measurement of channel quality may be carried out actively by analysing errors in a received, known bit pattern, or passively by SNR (signal/noise ratio) measurements. Measurement is carried out in the receiver. The measurement result is denoted symbolically hereinunder as m. The measurement results must be available in both transmitter and receiver, and must consequently be transferred to the transmitter. This takes place in the so-called return information.

The following steps are carried out during an interval of $T_h$ seconds:

1. Updating of the state matrix X with the results of previous channel quality measurements is carried out in both transmitter and receiver.

Symbolically: $(X,m) \rightarrow X$

The state matrix is possibly edited, meaning that previously prohibited frequencies are made permissible. The number of remaining permitted frequencies decides whether edition shall take place, and here the information in lines 2 and 3 in the matrix X is utilised.

2. A new frequency value is determined from the actual state matrix X. This is done in both transmitter and receiver.

When generating a new frequency value, a random number $r_n$ is selected, which is an integer in the interval 1 to N. The value used is indicated in the $r_n$-th column, in row 1 of X, i.e. $X(r_n, 1)$ = the mapping frequency.

Symbolically: $X \rightarrow$ new frequency value

FIG. 3 illustrates the procedure in more detail in a block diagram. The transmitter TA in station A transmits a bit pattern of given duration together with possible synchronised information from the input $i_1$. The receiver RB in station B receives the bit pattern and decides channel quality with the aid of a bit-by-bit comparison. The result (in the form of a channel quality measurement) is multiplexed with the rest of the transmitted information from the input $i_2$ on the transmitter TB, and coded according to a suitable code insensible to jamming and known to station A. A block or a repitition code is suitable for use. The return information is then sent back to the receiver RA in station A, where it is de-multiplexed and used to update the status of the matrix X in the transmitter TA.

The described method is especially suited for duplex communication. In surroundings with slowly changing environment, the method may also be used for the simplex mode.

In duplex mode, the return information is sent continuously in both directions. In simplex mode, return information is sent in one direction only for each transmission period. It takes a longer time to transfer the measurement results in simplex mode. However, if the environment changes slowly, so that the measurement results are not out of date when they are used, the method may also be used in simplex cases.

The block diagram of FIG. 4 shows the parts most important for the frequency and power selection in the method described. The bit pattern which is multiplexed in the transmitter TA (FIG. 3) is utilised partly for synchronising purposes, which is uninteresting in this connection partly for quality measurement on the receiver side MB.

The block diagram in FIG. 4 corresponds either to station A or station B according to FIG. 3. The transmitter side TA or TB includes a multiplexer MUX with three inputs $s_1$, $s_2$, $s_3$, and an output $s_4$, a modulator MOD for modulating the data signals from the output $s_4$, and a transmitter unit TX comprising a power amplifier and a mixer with input $s_5$ and output $s_6$, as well as further inputs connected to both outputs $s_7$, and $s_8$ from a microprocessor MD and to the output $s_9$ from a frequency synthesising unit FS1.

The receiver side RA (or RB) comprises a receiver unit RX having the input $m_1$, the output $m_2$ thereof being connected to a demodulator DEM corresponding to the demodulator MOD on the transmitter side. The output $m_3$ is connected to a demultiplexer DMUX, having the outputs $m_4$, $m_5$ and $m_6$, of which $m_5$ is connected via a measuring unit MT to the input of the microprocessor. The output $m_8$ of the microprocessor is connected to the frequency synthesizer unit FS2, the output $m_9$ of which is connected to the receiver unit FX.

A predetermined bit pattern is transmitted to the input $s_3$ from the microprocessor MD and coded return information from the encoder KD occurs at the input $s_2$, see below. Data from an external source that would normally be sent to station B is supplied to the input $s_1$. The multiplexed data flow from the output $s_4$ is frequency shift modulated in the modulator MOD and supplied to the transmitter unit TX, where the modulated data signal is mixed with a given frequency $f_x$ obtained from the frequency synthesising unit FS1. The frequency $f_x$ is one of the available hop frequencies $f_1$–$f_3$ according to FIG. 1, and the selection of a suitable frequency for the transmitter unit mixer is determined according to the described method. The output signal at the output $s_6$ is allowed to pass a circulator CR to the station antenna unit.

The microprocessor MD sends control signals for power and frequency from the outputs $s_7$ and $s_8$. Furthermore it sends a control signal from the output $m_8$ denoting what frequency $f_y$ which, after synthesizing in the unit FS2, is to be supplied to the receiver unit RX to obtain demodulation of the incoming signal at the demodulator input $m_2$.

At its output $m_5$ the demultiplexer DMUX give the bit pattern which has been transmitted from the station B and which is now measured in the unit MT with respect to its quality. The result of the measurement is sent from the output $m_7$ to the microprocessor MD. In the latter a decision is made in accordance with a given algorithm as to the channel quality of the used frequency $f_y$ (transmission: station B→station A). The channel quality is included in the return information from the microprocessor MD sent from the output $S_{10}$ to the encoder KD. The return information, which occurs at the input $s_2$ and which is transmitted to station B after processing in the units MUX, MOD and TX, thus indicates whether station A accepts the frequency $f_y$ selected in station B. The bit pattern sent from output $s_3$ of the microprocessor MD towards the station B is used in the same way by the microprocessor in station B to decide whether the frequency $f_x$ can provide reception such that it can be accepted by B. The decision is made in both station A and B as described above in connection with FIG. 2. The block diagram of FIG. 4 is also applicable for station B, with the difference that $f_x$ is replaced by $f_y$ and $f_y$ by $f_x$. The frequencies $f_x$ and $f_y$ are different for duplex transmission, but what is decisive is that the transmitter in station A sends at the same frequency as the receiver in station B uses as reception frequency and vice versa. This is achieved by the microprocessor MD being implemented with two parts $MD_x$ and $MD_y$. The processor part $MD_x$ contains a state matrix $X_x$ and a random number generator $G_x$ for selecting different values for the frequency $f_x$ during the frequency hop sequence. In a similar way the processor part $MD_y$ contains a state matrix $X_y$ and a random number generator $G_y$ for selecting different values for the frequency $f_y$. The generators $G_x$ and $G_y$ each generate random number series which are identically alike for stations A and B, i.e. the generator $G_x$ in station A generates the same random number sequence as the generator $G_y$ in station B, and the converse applying for the generator $G_y$. When transmission between the two stations starts, the state matrices $X_x$ and $Y_y$ are identical in both stations. Only the frequencies excluded from the beginning are prohibited in the starting situation.

During the communication (duplex) between stations A and B, quality measurement and transmission of return information takes place according to the above. A state set is then gradually built up in the matrices for the frequencies $f_x$ and $f_y$ determining the frequencies that may be used at the frequency hops. The status matrices in both stations A and B and for the frequencies $f_x$ and $f_y$ used will then be adjusted to the same status values.

The method in accordance with the invention can, as already indicated, also be extended to adjustment of the transmitted power, see items 3 and 4 above. The microprocessors in stations A and B thus contain a state variable Q giving the status of the power received from the transmitter units TX in the respective station. The measurement Q is updated for every frequency hop. In this situation Q is dependent on the previous value $Q_1$ and the quality measurement m, see item 3. It is then determined from the new status value, e.g. by reference comparison, whether the transmitter power shall be increased, reduced or remain unaltered (approved). The result of the comparison constitutes an order from the receiver to the transmitter in the communicating station, this order being conveyed via the return information. The output $s_7$ of the microprocessor MD sends control information regarding possible change in the transmitted power to the transmitter unit TX.

We claim:

1. A method for reducing the effect of narrowband jammers in communication between a first station (A) and a second station (B) across a radio channel having a varying transmission quality in dependence on said jammers by using frequency hopping which includes periodically changing a transmitting frequency (fx) from the first station (A) to the second station (B) and a transmitting frequency (fy) from the second station (B) to the first station (A) with a given period (Th), there being randomly generated a plurality of fixed frequencies ($F_1, \ldots f_n$) available for the frequency hopping, each of said frequencies having mutually different or equal status values indicative of giving disturbance free or acceptable communication across said radio channel, a characteristic signal being sent from said first station (A) to said second station (B) on one of said fixed frequencies ($f_1, \ldots f_n$) to test the channel quality for that frequency with respect to said jammers when communicating between said stations (A,B), measuring the result of the test of said quality in said second station (B), transmitting said result from said second station (B) and receiving the same in the first station (A) in a form such that the result is not affected by said jammers, entering the result as a status value for said frequency (fx), and deciding in dependence on said status value whether said frequency should be used as a transmitting frequency (fx) or if a second frequency should be chosen as a communicating frequency, said second frequency representing a mapping frequency obtained from a previous measurement giving disturbance free communication.

2. A method according to claim 1 wherein the quality of said channel is measured by comparing the signal received in said second station (B) corresponding to said characteristic signal transmitted from said first station (A) with its counterpart in said second station (B) identical to said characteristic signal, coding the result of the comparison so as not to be affected by said jammers, and transmitting the result from the second station (B) to the first station (A).

3. A method as claimed in claim 2 wherein said characteristic signal is transmitted from said first station (A) an received by said second station (B) together with the information intended to be communicated between said stations (A,B).

4. A method as claimed in claim 1 wherein said status value can assume three different levels for each of said randomly generated frequencies ($f_1, \ldots f_n$), said levels including a first level indicating an acceptable radio channel for that frequency, a second level indicating a non-acceptable radio channel and a third level indicating a slip in the two frequencies ($f_x, f_y$) used between the first station and the second station, and between the second and first station, respectively.

* * * * *